(No Model.)
M. CRAWFORD.
PROCESS OF EXTRACTING PRECIOUS METALS FROM THEIR ORES.
No. 543,673. Patented July 30, 1895.
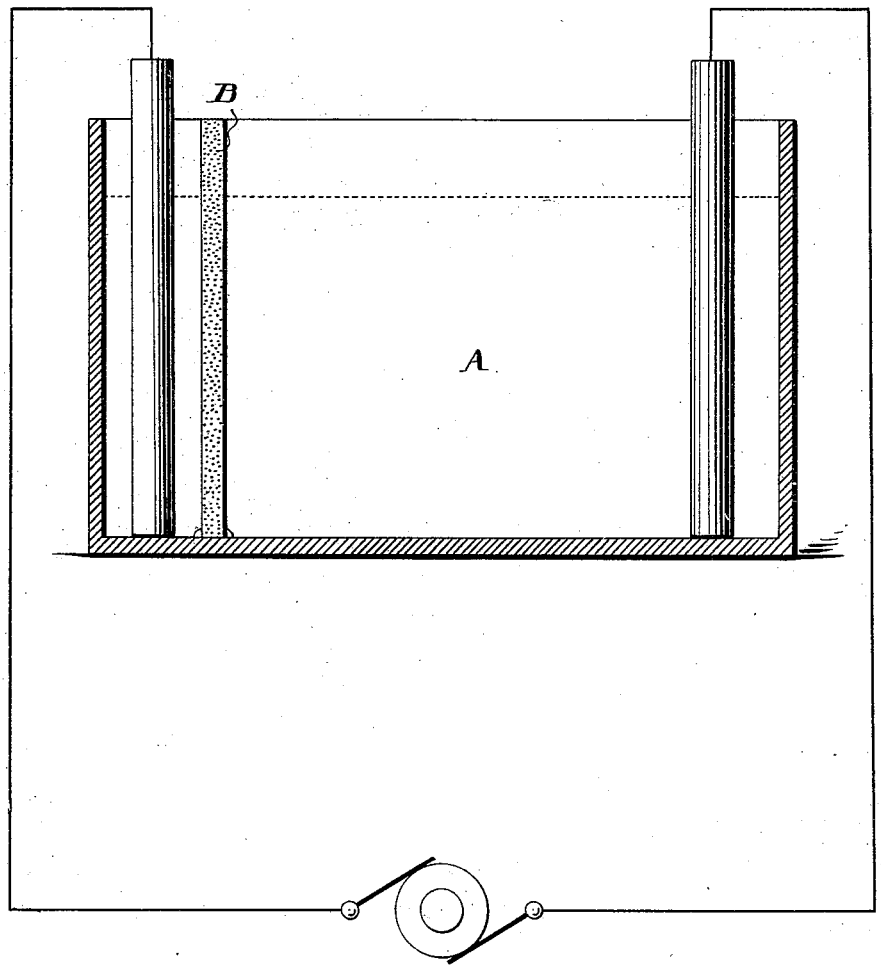
WITNESSES
James H. Bell
Randolph Sailer
INVENTOR
Middleton Crawford
By Ed. C. Haley
Attorney

United States Patent Office.

MIDDLETON CRAWFORD, OF COLORADO SPRINGS, COLORADO, ASSIGNOR OF THREE-FOURTHS TO THOMAS C. PARRISH AND DUNCAN CHISHOLM, OF SAME PLACE, AND JAMES POURTALES, OF SILESIA, GERMANY.

PROCESS OF EXTRACTING PRECIOUS METALS FROM THEIR ORES.

SPECIFICATION forming part of Letters Patent No. 543,673, dated July 30, 1895.

Application filed October 29, 1894. Serial No. 527,342. (No specimens.)

*To all whom it may concern:*

Be it known that I, MIDDLETON CRAWFORD, a subject of the Queen of Great Britain, (but having declared my intention of becoming a citizen of the United States,) residing at Colorado Springs, in the State of Colorado, have invented certain new and useful Improvements in the Process of Extracting Precious Metals from Their Ores, (Case B,) whereof the following is a specification, reference being had to the accompanying drawing.

My invention relates to an improved process for the extraction and recovery of precious metals by means of the solvent action upon said metals of the salts of cyanogen, commonly known as the "cyanide" process, and relates more specifically to the facilitating of this process by the application of electricity.

In the drawing, A represents a tank. B represents a partition dividing the tank into two compartments of equal size. Within each of these compartments are situated electrodes with suitable connections to a generator of electricity, as indicated diagrammatically.

Generally speaking, the cyanide process consists, first, in lixiviating the pulverized ore with a solution of cyanide of potassium or other similar salts, the result being the formation from a portion of the gold and silver or other precious metal of a soluble aurocyanide of potassium or other corresponding salt, and, second, in separating the precious metals from this solution by electrolysis, or by passing the solution over zinc plates or shavings, whereby the precious metals are precipitated, or by other appropriate means. This process has heretofore usually been applied to what are termed "tailings"—that is, to gangue which has already been treated by an amalgamating process—the amalgamating process, as is well known, being very efficient for the removal of the larger particles of gold, but always failing more or less to remove the microscopic or float gold, or the gold contained in concentrates, which latter forms are particularly amenable to the cyanide process.

My invention has reference to the preparation of the cyanide solution, to its use in combination with an amalgamating process, and to its continous use over and over again.

The chief difficulty hitherto incurred in the cyanide process has resulted from the great length of time required to fully dissolve the precious metals in the cyanide solution, requiring as ordinarily practiced many days and even weeks. Many efforts have been made to facilitate this process by the passage of an electric current through the solution in the presence of the gold, but without as yet any marked success. Another difficulty incurred in this process has resulted from the cost of the cyanide of potassium or other salt used to form the cyanide solution, large quantities of this salt being used in making up each fresh cyanide solution and all, or a large part, of such solution being decomposed and rendered useless by the process employed in reclaiming the gold.

My invention relates to a method of treating the solution of cyanide with olectricity prior to its employment in the lixiviating process, by means of which the rate at which the dissolution of the gold or silver is accomplished is greatly facilitated, and the quantity capable of being dissolved greatly increased. The result of this electrical treatment I believe to consist in providing the cyanide solution with an excess of oxygen existing in the form of a cyanate formed from a portion of the cyanide.

It has been recognized hitherto that the solution of gold in cyanide of potassium and the consequent formation of aurocyanide requires the presence of oxygen, the formula by which this reaction takes place being expressed as follows:

$$4Au + 8KCy + 20 = 4KAuCy_2 + 2K_2O,$$

and methods have been experimented with in order to supply this extra molecule of oxygen, but without practical results, the difficulty with these methods being that the oxygen exists in such unstable combination as to be given off before it can be made practically available. When, however, the oxygen takes the form of a cyanate, it is in a sufficiently stable form, and I have discovered that while neither the cyanide nor the cyanate of potassium in solution is capable of readily dissolving gold, yet the addition to the solution of a small quantity of cyanate renders it capable of dissolving gold with great rapidity. From this and other facts I draw the inference that the result of treating the cyanide solution with electricity, in accordance with the process about to be described, is the formation of a limited quantity of cyanate, which contains the necessary excess of oxygen. I have also accomplished the same result by adding to the cyanide solution certain chemicals which are capable of converting, and I believe do convert, a portion of the cyanide into cyanate; but these processes form the subject-matter of another application filed simultaneously herewith, Serial No. 527,341, while this application has reference solely to the accomplishment of this result by electrical treatment; and it is to be further understood that, although I believe the explanation above given of the formation of cyanate to be correct, yet I do not wish to confine myself to this theory.

When a weak solution of cyanide of potassium has a moderately-strong current of electricity passed through the same, a certain part of the water is disintegrated into its elements, and I find that, at least to a certain extent, the cyanide solution which has been so treated is capable of dissolving gold more rapidly than would otherwise be the case; but although a solution through which such a current has been passed acquires this property to a certain extent I find that the efficiency of the solution is greatly increased when there is interposed between the two poles, so as to separate the solution into two distinct parts, a porous partition of sufficient thickness to substantially prevent circulation of the electrolyte from one compartment to the other, although permitting the passage of the current. Under these circumstances the portion of the solution within which the oxygen or positive pole is situated rapidly increases its gold-dissolving capacity, while, on the other hand, that portion of the solution in which the negative pole is situated does not so increase in its capacity to dissolve gold. As I have before stated, I believe this result to be a consequence of the presence of an excess of oxygen in that portion of the solution which surrounds the positive pole, and I also believe that this excess of oxygen enters into chemical combination with a portion of the cyanide so as to form a cyanate; but I do not wish to confine myself to this theory. In order to practically avail myself of this property of the electric current, I employ the apparatus which is figured in the accompanying drawing, in which—

A represents a tank which may be of any suitable shape or size. It is divided into two portions by a porous partition B, and it is more convenient to have one of these portions much larger than the other, although this, of course, is not essential. Within one of these compartments, and preferably the smaller one, is situated an iron or copper electrode, and within the larger compartment is correspondingly situated a carbon electrode. The composition of the electrodes may be varied, although that in the larger compartment should be composed of a substance practically insoluble in a cyanide solution, and is therefore preferably of carbon. This insoluble electrode is connected with the positive pole of a dynamo or other source of electricity and the copper electrode with the negative pole. Both portions of the receptacle are then filled with a weak solution of cyanide of potassium, the strength of which varies in accordance with the character of the ore which is to be treated. The current is then passed continuously through the solution and in a short time, varying with the amount of current used and other conditions, the cyanide solution in the receptacle within which is immersed the carbon pole has very largely increased its gold-dissolving capacity. When this point has been reached, which may be ascertained by appropriate tests, the solution is drawn off and fed into a lixiviating-tank, where it is mingled with the pulverized ore and with which if necessary it may be agitated.

By reason of the application of the process which I have described a solution which under ordinary circumstances would require several days to dissolve the finely-divided free metal from the ore is now capable of doing the same thing in the space of about an hour. When the lixiviating process has proceeded for the requisite length of time, the gangue and also the solution are withdrawn from the lixiviating vessel, and if the ore which is being treated has contained comparatively coarse particles of metal (which particles are incapable of solution by a cyanide process under any circumstances within any reasonable time) the gangue with its accompanying solution is passed through an amalgamating process whereby this coarse gold may be reclaimed, which process in case electrical amalgamation is employed extracts a certain portion of the dissolved metal from the solution by precipitation. The tailings are then separated from the solution by means of any suitable process and the solution treated electrolytically until all the dissolved gold is separated therefrom. The residuum of cyanide solution may then be run back, preferably through rubber pipes, to the tank in which it was originally subjected to the action of an electric current in the region of the positive pole and used over again, thus making the process continuous. It must be observed, however, that the electrical treatment whereby the efficiency of the solution is renewed is wholly distinct from the electrolytic separation from the solution of the gold.

I find that by reason of the electrical treatment of the cyanide solution which I have described its tendency to decompose is very much decreased, making it possible to continue to use the same solution for a much greater length of time than would otherwise be the case. I also find as a result of my process that while the facility with which the soluble salts of the precious metals are formed is greatly increased there is no corresponding increase, but rather a decrease in the facility with which the various cyanide salts of the base metals are formed, and consequently there is less waste of the cyanide and also a purer metal as the result of the final electrolytic separation than would be the case under similar conditions were the cyanide solution not treated by my process.

Many variations of the process, as above described, will readily suggest themselves. Thus, as the solution in the smaller receptacle is not employed for any purpose other than that of a conductor it may be replaced by a solution of any suitable and cheap salt—as, for instance, sulphate of soda. Furthermore, to the extent to which the passage of the electrical current through the solution increases its gold-dissolving capacity, irrespective of the presence of a porous partition, it is an improvement over existing processes even when the partition is not employed, and I find that by properly regulating the respective sizes of the electrodes the strength and quantity of the current and the strength of the solution a cyanide solution may be thus prepared by the simple passage of the current through it, which has a marked increase in its capacity for dissolving gold, and which may therefore be used in accordance with the process which I have more particularly described.

In case the cyanate hypothesis is correct, it is evident that the oxygen in the solution prior to the lixiviating process is present in the cyanate, but when the gold has been taken up and a double cyanide of gold and potassium formed it is present in the form of a corresponding quantity of caustic potash or similar oxide of whatever base has been used; and then, again, after the electrical separation has proceeded, it recurs in the cyanate, which alternation of form explains the continuity of my process and the stability of the solution formed by it. Upon this hypothesis the formula representing the recurrent change is as follows:

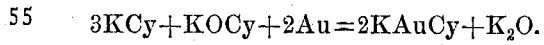

$$3KCy + KOCy + 2Au = 2KAuCy + K_2O.$$

Furthermore, I believe that the cyanide solution attains its highest efficiency when the electric current in the region of the positive pole has passed through it for a sufficient length of time to convert such an amount of the cyanide into cyanate that the proportion of the latter to the former in the solution is from twenty-five to one hundred per cent. When the current is passed through the solution for too great a length of time its efficiency diminishes, which I attribute to the conversion of too large a portion of the cyanide into cyanate.

Although the solution from which the gold has been electrolytically separated should in theory be precisely the same as originally used, yet in practice a certain amount of degeneration invariably occurs. The loss of cyanogen is, however, small, and the efficiency is readily restored by again subjecting it to the electric current, as above described.

The advantages of this process are obvious. The comparatively short time required for the lixiviating process enables the ore to be rapidly run through, so that the quantity of ore which may be treated by a given amount of cyanide is very largely increased. This renders it practicable to apply the cyanide process not simply to tailings, as has heretofore been done, but to the ore as it comes from the mines, and by combining it with an amalgamating process in the order I have described—that is to say, passing the gangue over the mercury subsequent to its lixiviating with the cyanide—I find that by means of what is practically one continuous process I am able to extract a larger proportion of precious metal from the ore than has hitherto been done by the use of the two separate processes.

Another great advantage is the cheapness occasioned by the continuity of the process, for as the solution is used over and over again the amount of cyanide of potassium or other salt which need be added from time to time to take the place of whatever amount may have been lost is comparatively small.

Having thus described my invention, I claim—

1. The improved process of removing precious metals from their ores, which consists in exposing a cyanide solution to the action of an electric current in the region of the anode only until considerable portion of said solution is converted into cyanate by electrolytic action, and employing said solution as an agent for lixiviating the ore, substantially as described.

2. The improved process of removing precious metals from their ores, which consists in subjecting a cyanide solution to the action of an anode which is separated from its cathode by a porous partition sufficiently dense to substantially prevent circulation of the electrolyte, and employing said solution as an agent for lixiviating the ore, substantially as described.

3. The improved process of removing precious metals from their ores, which consists, first, in exposing a cyanide solution to the passage of an electric current; second, in withdrawing only that portion of said solution which is in the region of the anode, and lixiviating the ore with it; and, third, in reclaiming the precious metals from this solution, substantially as described.

4. The improved process of removing precious metals from their ores which consists, first, in exposing a cyanide solution to the passage of an electric current in the region of the anode only; second, in lixiviating the ore with said solution without electrolytic action; and, third, in reclaiming the precious metals from this solution, substantially as described.

5. The improved process of removing precious metals from their ores which consists, first, in lixiviating the ore with a cyanide solution which has been exposed to an electric current in the region of the anode; second, in subjecting the gangue and accompanying solution to an amalgamating process; and, third, in withdrawing the solution from the tailings and reclaiming the precious metals therefrom, substantially as described.

6. The improved process of removing precious metals from their ores which consists, first, in lixiviating the ore with a cyanide solution which has been previously exposed in a storage receptacle to an electric current in the region of the anode; second, in reclaiming the precious metals from said solution in a different receptacle; and, third, in returning the solution from which the precious metals have been separated to the storage receptacle and re-subjecting it to the action of the electric current in the region of the anode that it may be used over again as before, substantially as described.

7. The improved process of removing precious metals from their ores which consists, first, in subjecting a cyanide solution to an electric current in the region of the anode; second, in lixiviating the ore with said solution; third, in subjecting the ore and its accompanying solution to an amalgamating process; fourth, in separating the solution from the tailings; fifth, in removing the dissolved precious metals from the solution; and, sixth, in returning the said solution to the compartment wherein it was subjected to step one of this claim, substantially as described.

8. The improved process of removing precious metals from their ores which consists, first, in lixiviating the ore with a cyanide solution which has been subjected to the action of an anode separated from its corresponding cathode by a porous partition which substantially prevents the circulation of the electrolyte; second, in withdrawing said solution and removing the precious metals therefrom; third, in again subjecting the solution to the action of an anode separated from its corresponding cathode as before and using it over again in continuous rotation, substantially as described.

9. The improved cyanide process, which consists in dissolving precious metals in a cyanide solution; separating the said metals from said solution; and exposing the entire solution to an electric current in the region of the anode only prior to using it over again, substantially as described.

MIDDLETON CRAWFORD.

Witnesses:
ELLIS L. SPAEKMAN,
HENRY L. B. WILLS.